United States Patent Office 3,466,276
Patented Sept. 9, 1969

3,466,276
2-PIPERIDYLGLYCOL KETALS OF STEROIDAL COMPOUNDS
J Allan Campbell and John C. Babcock, Kalamazoo, Mich., assignors to The Upjohn Company, Kalamazoo, Mich., a corporation of Delaware
No Drawing. Filed Sept. 5, 1967, Ser. No. 665,218
Int. Cl. C07c *173/10;* A61k *27/00*
U.S. Cl. 260—239.55                               5 Claims

ABSTRACT OF THE DISCLOSURE

Novel 2-piperidylglycol ketals of steroids having the following formulae:

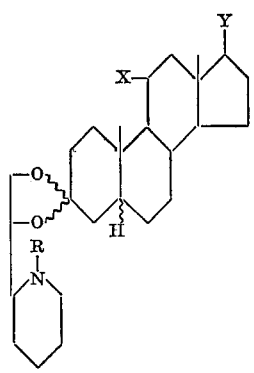

(A)

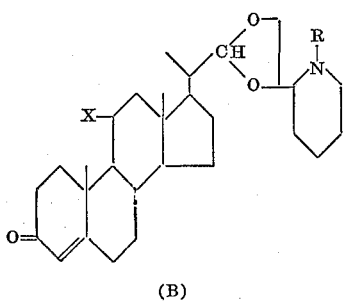

(B)

possess valuable antifungal activity. They are made by reacting the corresponding 3-ketone in the case of A, or 21-aldehyde in the case of B with 2-piperidylglycol in the presence of an acid catalyst.

BRIEF DESCRIPTION OF THE INVENTION

The products of the invention represented, typically by the following species compounds,

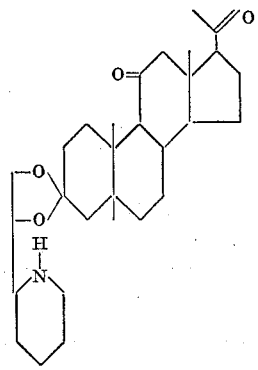

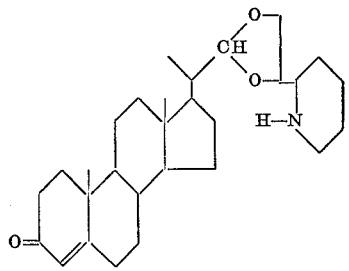

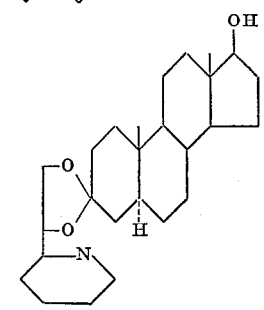

are a novel class of 2-piperidylglycol ketals of steroids in which, referring to the general Formulae A and B above, X is hydrogen, β-hydroxyl, α-hydroxyl or a ketonic oxygen group and R is hydrogen or aliphatic of 1 to 8 carbon atoms such as methyl, ethyl or ethylenyl. The value for Y can be ketonic oxygen, α- or β-hydroxy, α- or β-lower acyloxy, α-hydroxy-β-methyl, β-hydroxy-α-methyl, α-hydroxy-β-ethynyl, β-hydroxy-α-ethynyl, α- or β-acetyl, β-hydroxy-α-acetyl, β-acetyl-α-hydroxy, α-acetyl-β-lower acyloxy, α-lower acyloxy-β-acetyl, β-hydroxy-α-(2-hydroxy-acetyl), α-hydroxy-β-(2-hydroxyacetyl). In this specification and claims the wavy line ($\xi$) is a generic expression designating α or β stereoconfiguration, or mixtures thereof. The number of carbon atoms in the lower acyl group can be from 1 to 8 carbon atoms, inclusive.

Substituent methyl groups at position 6, 7 and 16 of Formula A do not interfere in the reaction, and are included within its broad scope. As to Formula B, a methyl substituent at position 6 does not interfere and is included within its broad scope.

Under the reaction conditions of the examples and as will be described generally in the succeeding paragraphs of this specification, the known nonconjugated 3-ketones and 21-aldehydes which constitute the starting materials for the production of A and B, respectively, form the 2-piperidyl ketals quite readily. We have discovered, though, that 11-ketones, 20-ketones and conjugated 3-ketone groups as are also present in the three typical products shown above, do not react to any substantial extent.

The ketal products represented by A and B are a mixture of stereoisomers as can be seen from the new asymmetric centers introduced by the reaction. For the purpose of this invention and to realize the usefulness of the products as antifungal agents, separation of the isomers into pure isomeric forms is not necessary. It can nonetheless be accomplished by known methods of separating diastereoisomers as by fractional crystallization, chromatographic separation, counter-current distribution and the like.

Typical starting materials for the production of A are pregnane-3,11,20-trione, pregnane-3,20-dione, 17β-hydroxyandrostan-3-one, 11β,17β - dihydroxyandrostan-3-one, 6 - methylpregnane-3,11,20-trione, 17β - hydroxy-7-methylandrostan-3-one, 11β,17α,21-trihydroxypregnane-3,20-dione and 17β-hydroxy-6α,17α-dimethylandrostan-3-one. Each of these starting materials, when subjected to the reaction conditions described in the following examples, produces the corresponding cyclic 3-(2-piperidylglycol ketal), i.e., pregnane-3,11,20-trione, cyclic 3-(2-piperidylethylene acetal); pregnane-3,20-dione, cyclic 3-(2-piperidylethylene acetal); 17β-hydroxyandrostan-3-one, cyclic 3-(2-piperidylethylene acetal); 11β,17β-dihydroxyandrostan-3-one, cyclic 3-(2-piperidylethylene acetal); 6-methylpregnane-3,11,20-trione, cyclic 3-(2-piperidylethylene acetal); 17β-hydroxy-7-methylandrostan-3-one, cyclic 3-(2-piperidylethylene acetal); 11β,17α,21-trihydroxypregnane-3,20-dione, cyclic 3-(2-piperidylethylene acetal); and 17β-hydroxy-6α,17α-dimethylandrostan-3-one, cyclic 3-(2-piperidylethylene acetal).

Typical starting materials with respect to the product of B are 3-ketobisnor-4-chlolenaldehyde, 3-keto-6α-methylbisnor-4-chloenaldehyde. These starting materials, when subjected to the reaction conditions described in the following examples, produce the corresponding 2-piperidylglycol ketal, i.e., 3-oxo-pregn-4-ene-20-carboxaldehyde, cyclic 22-(2-piperidylethylene acetal); 6α-methyl-4-ene-20-carboxaldehyde, cyclic 22-(2-piperidylethylene acetal).

DETAILED DESCRIPTION OF THE INVENTION

According to the invention, the starting material described in the previous brief description of the invention is brought to reactive contact with 2-piperidlylglycol in the presence of an acid catalyst in an inert reaction medium. Energy is supplied in the form of heat, conveniently at reflux temperature with medium boiling inert solvents. The reaction may be hastened and driven more nearly to completion by removal of the water as it is formed by azeotropic distillation or by trapping the water from the condensate during reflux.

The 2-piperidylglycol is preferably supplied as an acid addition salt, e.g., the p-toluenesulfonate or hydrochloride in an acid containing inert reaction medium, e.g., p-toluenesulfonic acid in benzene or hexane, with the starting steroid carbonyl compound of Group A or Group B described above. This is conveniently carried out by preparing the reaction mixture containing the free base glycol, an amount of p-toluenesulfonic acid or similar acid in substantial excess over that required to form the glycol addition salt, the steroid and the reaction solvent. Reaction is accelerated by heating, e.g., at reflux temperature, and further amounts of acid can be added to maintain acid conditions.

Recovery of the desired product from the reaction mixture is accomplished by neutralizing the acidic reaction mixture, preferably with an aqueous solution of a base and then separating the product from the neutralized mixture, as by extraction with an organic solvent such as benzene, toluene, hexanes, and the like. Recovery of the product from the extract can be accomplished by known methods, e.g., chromatographic separation, solvent removal, crystallization and the like. Recovering and purification can be accomplished by selective crystallization, further chromatography, and counter-current extraction.

The acid catalyst can be any such substance used conveniently to form acetals or ketals by reaction with organic carbonyl compounds and alcohols. For practical reasons, we prefer p-toluene-sulfonic acid monohydrate.

The base used to neutralize the reaction mixture can be any organic or inorganic water-soluble base such as sodium or potassium bicarbonate, ammonium hydroxide, sodium or potassium acetate, and the like. We prefer saturated sodium bicarbonate solution.

As stated previously, the compounds of this invention occur in the reaction media as a mixture of stereoisomers, and they can be separated from each other in known manner. The starting glycol is preferably used in one or the other of its relatively pure stereoisomeric forms, and this leads to the corresponding relatively pure stereoisomer in the ketal product.

The compounds of this invention can exist and are useful as fungicides in their free base, acid addition, quaternary ammonium salt and N-oxide forms. Among those acid addition salts included are the hydrochloride, sulfate, phosphate, acetate, lactate, leucinate, α-aminopropionate, glycolate and the like. The quaternary ammonium salts can be formed in the conventional manner with methyl, ethyl or propyl bromide, benzyl chloride and the like. The N-oxides likewise can be formed in known manner.

The following specific examples illustrate the invention.

EXAMPLE 1

3-oxopregn-4-ene-20-carboxaldehyde, cyclic 22-(2-piperidylethylene acetal)

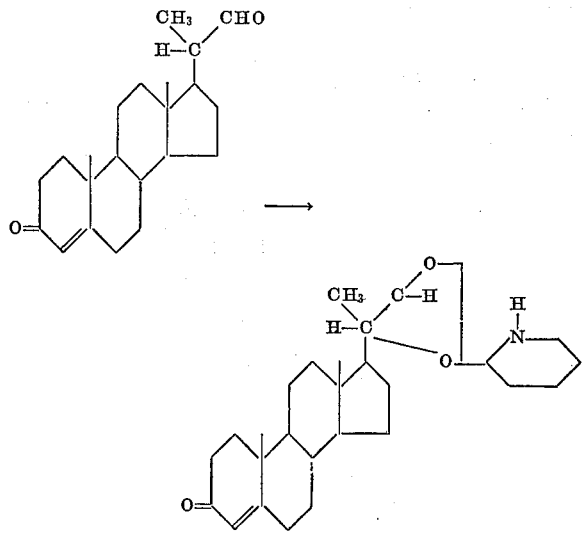

A mixture of 12.2 g. of 2-piperidylglycol, 16.2 g. of p-toluenesulfonic acid monohydrate, 6.5 g. of 3-ketobisnoraldehyde and 300 ml. of benzene as refluxed 1½ hours, the condensate was passed through a Dean-Stark trap to remove any water that formed. Another 0.5 g. of p-toluenesulfonic acid was added and reflux continued an additional hour. The solution was cooled and neutralized with saturated sodium bicarbonate solution and extracted with benzene. The benzene phase was washed several times with water, dried over sodium sulfate and concentrated to dryness. It was chromatographed through Florisil using gradient elution between 10% acetone-Skellysolve B and 40% acetone-Skellysolve B. The early fractions were discarded and the later glassy residues were combined to give 3.87 g. of ketal as an amorphous solid.

*Analysis.*—Calcd. for $C_{29}H_{45}NO_3$: N, 3.06. Found: N, 3.35.

EXAMPLE 2

5β-pregnane-3,11,20-trione, cyclic 3-(2-piperidylethylene acetal)

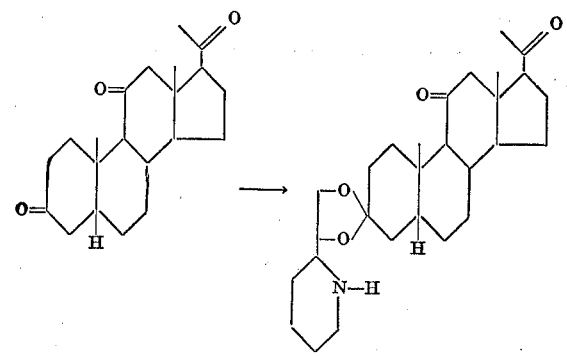

A mixture of 4.0 g. of 5β-pregnane-3,11,20-trione, 7.38 g. of 2-piperidylglycol, 9.95 g. of p-toluenesulfonic acid and 185 ml. of benzene was heated at reflux for 2¼ hours and passing the condensate through a Dean-Stark trap to remove the water formed. The solution was cooled and neutralized with sodium bicarbonate solution and extracted with ether. The extracts were washed with water, dried over sodium sulfate, concentrated to dryness and chromatographed through Florisil. A small amount of starting material was eluted first followed by the desired 5β-pregnane - 3,11,20 - trione, cyclic 3-(2-piperidylethylene acetal). The ketal was obtained as a glassy form, yield 1.73 g.

*Analysis.*—Calcd. for $C_{28}H_{43}O_4N$: N, 3.06. Found, N, 2.95.

EXAMPLE 3

17β-hydroxy-5α-pregnan-3-one, cyclic (2-piperidylethylene acetal)

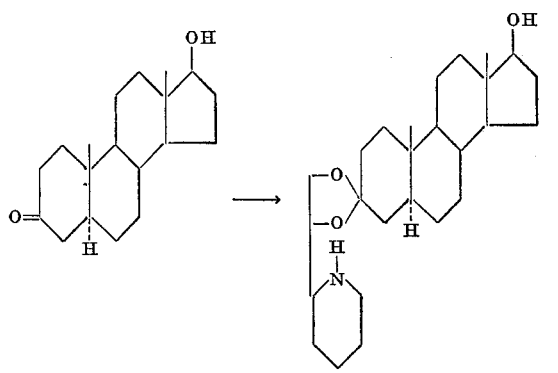

Following the above procedure 4.0 g. of androstanolone, 7.38 g. of 2-piperidylglycol, 9.95 g. of p-toluenesulfonic acid and 185 ml. of benzene gave the ketal. It was recrystallized from acetone-Skellysolve B to give 610 mg., M.P. 180–195°.

*Analysis.*—Calcd. for $C_{26}H_{43}NO_3$: N, 3.49. Found: N, 3.13.

EXAMPLE 4

6α-methyl-5β-pregnane-3,11,20-trione, cyclic 3-(2-piperidylethylene acetal)

Substitution of 6α-methyl-5β - pregnane-3,11,20-trione for the starting material of Example 2, above, is productive of 6-methyl-5β-pregnane-3,11,20-trione, cyclic 3-(2-piperidylethylene acetal).

The 2-piperidyl steroid compounds of this invention are useful as topically administrable fungicides. They are active in free base form or in the form of the non-toxic, pharmaceutically acceptable acid salts, quaternary ammonium salts or N-oxide forms.

They are useful in the topical treatment of fungal infections of the skin of animals and may be used in the treatment or prevention of conditions caused by the Trichophyton organisms, e.g., athletes foot. They can be used as solutions, suspensions or emulsions in the manner known in the art. They can be dispersed in an inert carrier such as vegetable oil (e.g., olive oil), long chain fatty esters (e.g., isopropyl palmitate), alkanols (ethanol) and the like to form the emulsion or suspension with the acid of a surface active substance such as natural or synthetic soaps, quaternary ammonium compounds or the like (e.g., sodium lauryl sulfate), as is known in the art. They can be used as a powder or dust, and for this use can be mixed with the conventional extending agents used in the art such as talc or boric acid.

As examples of the fungicidal properties of the compounds of this invention 5β-pregnene - 3,11,20 - trione, cyclic 3-(2-piperidylethylene acetal) showed marked inhibition of *Trichophyton violaceum* and *T. mentagrophytes* in a standard antifungal assay. Likewise, 17β-hydroxy-5α-pregnan-3-one, cyclic (2-piperidylethylene acetal) inhibited *Blastomyces dermatitidis, T. violaceum, T. asteroides* and *T. mentagrophytes*. Likewise, 3-oxopregn-4-ene - 20 - carboxaldehyde, cyclic 22-(2-piperidylethylene acetal) inhibited *Nocardia asteroides, B. dermatitidis,* *Cryptococcus neoformans, Histoplasma capsulatum, Sporotrichum schenkii, Monosporium apiospermum, T. rubrum* and *T. violaceum.*

We claim:
1. A member of the group consisting of A:

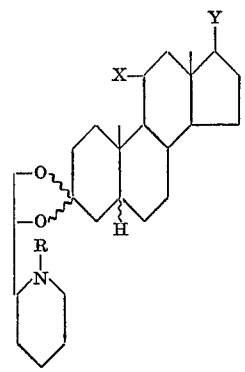

and B:

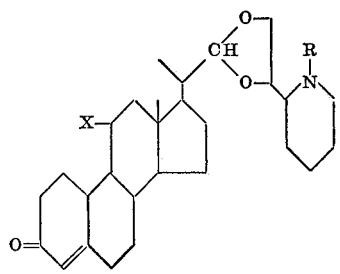

wherein X is selected from the group consisting of hydrogen, β-hydroxyl, α-hydroxyl or a ketonic oxygen group, R is a member of the group consisting of hydrogen or aliphatic hydrocarbon of 1 to 8 carbon atoms, and Y is selected from the group consisting of ketonic oxygen, α- or β-hydroxyl, α- or β-lower acyloxy, α-hydroxy-β-methyl, β-hydroxy-α-methyl, α-hydroxy-β-ethynyl, β-hydroxy-α-ethynyl, α- or β-acetyl, β-hydroxy-α-acetyl, β-acetyl-α-hydroxy, α-acetyl-β-lower acyloxy, α-lower acyloxy-β-acetyl, β-hydroxy-α-(2-hydroxy-acetyl), α-hydroxy-β-(2-hydroxy acetyl).

2. A compound in accordance with claim 1, 3-oxopregn-4-ene - 20 - carboxaldehyde, cyclic 22-(2-piperidylethylene acetal).

3. A compound in accordance with claim 1, 5β-pregnane-3,11,20-trione, cyclic 3-(2-piperidylethylene acetal).

4. A compound in accordance with claim 1, 17β-hydroxy-5α-androstan - 3 - one, cyclic (2-piperidylethylene acetal).

5. Process for the production of piperidylglycol ketals of steroids having the following formulae:

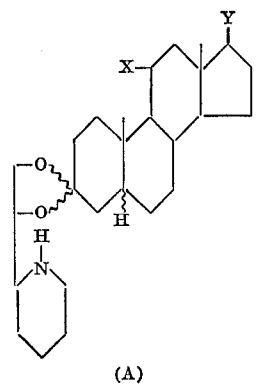

(A)

and

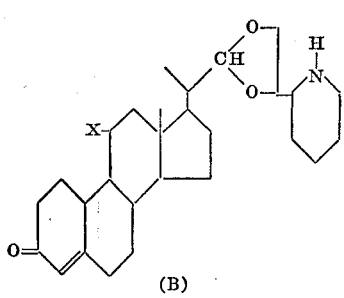

(B)

wherein X is selected from the group consisting of hydrogen, β-hydroxyl, α-hydroxyl or a ketonic oxygen group, Y is selected from the group consisting of ketonic oxygen, α- or β-hydroxyl, α- or β-lower acyloxy, α-hydroxy-β- methyl, β-hydroxy-α-methyl, α-hydroxy-β-ethynyl, β-hydroxy - α - ethynyl, α- or β-acetyl, β-hydroxy-α-acetyl, β-acetyl-α-hydroxy, α-acetyl-β-lower acyloxy, α-lower acyloxy-β-acetyl, β-hydroxy - α - (2-hydroxy acetyl), α-hydroxy-β-(2-hydroxy acetyl) which comprises reacting the corresponding 3-keto steroid in the case of A or the corresponding 21-aldehde in the case of B with 2-piperidylglycol in the presence of an acid catalyst, and recovering the resulting steroid 2-piperidylglycol ketal from the reaction mixture.

No references cited.

ELBERT L. ROBERTS, Primary Examiner

U.S. Cl. X.R.

424—199, 241